UNITED STATES PATENT OFFICE.

MERRIWEATHER J. WAUGH, OF LINCOLN, NEBRASKA.

PAINT.

987,605. Specification of Letters Patent. Patented Mar. 21, 1911.

No Drawing. Application filed June 23, 1910. Serial No. 568,531.

*To all whom it may concern:*

Be it known that I, MERRIWEATHER J. WAUGH, a citizen of the United States, residing at Lincoln, Lancaster county, Nebraska, have invented certain new and useful Improvements in Paints, of which the following is a specification.

This invention relates to improvements in paints for use principally in normal climates, (see copending application, Serial No. 568,101) and has for its essential object to produce a controllable paint coat of heterogeneous chemical and physical structure to withstand the usual temperature changes of a normal climate, the paint having a maximum of elasticity and adhesive power, corresponding with that of the expansion and contraction of the painted surface to which it is applied, thus rendering the same climate proof. It is to be understood that reference to a normal climate is made in contradistinction to humid, dry and arid climates, where the peculiar weather conditions affect paints differently.

In the practice of this invention I have found it desirable to employ a coarse pigment of chemically stable character and crystalline structure to furnish paints for capillary action for giving a coat of sufficient thickness. To fill the spaces between these coarse particles, pigments of great fineness are added, both for the purpose of shielding the easily destroyed linoxyn (dried linseed oil) from atmospheric action and to render this oil coat impermeable by gases and moisture, as well as to give a hiding power or opacity to the paint. I have found it desirable to use approximately 71% sublimed white lead as the major pigment, since it is not only an exceedingly fine grained material (diameter of particle 1/35000 inch) but, in addition, it is of great chemical stability. For general exterior use it is necessary to employ a hardening coat, because the coat made with sublime white lead or other lead pigment alone is physically too soft to withstand abrasion, and it is for this purpose that approximately 18.25% zinc oxid is preferably employed. Zinc oxid, when mixed with linseed oil and the proper amount of drier, sets and dries more slowly than white lead. Nevertheless, this drying continues in the form of progressive oxidation until the surface becomes very hard. A comparison between zinc oxid and white lead paints shows that the progressive oxidation which takes place when white lead dries produces a chalky mixture, while the reverse is true of zinc oxid, which produces a hard, vitreous surface. Owing, therefore, to the diverse effects of the two pigments, a combination of sublimed white lead and zinc is for practical purposes desirable.

Approximately 7.75% fibrous magnesium silicate is employed as an inert pigment, since this material has the added physical advantage of presenting what is known as a "tooth", which is especially desirable for repainting, and it is inert as an extender or filler in paint and does not combine with any other pigment or vehicle. Fibrous magnesium silicate preferably in the form of comparatively long hairlike crystals of asbestos is desirable, since it tends to remain in suspension and to retain the admixed pigments in suspension therewith. The hairlike crystals of the asbestos interlace very much like feathers in a pillow, thus "fluffing" the entire mix. It has been found that substantially 7.75% of silicate may be safely added to the mixed paint without detracting from its covering property as well as increasing its wearing quality. To the aforesaid pigments is added a fourth material (approximately 3%), which preferably is a matter of selection, the essential being that it shall be crystalline in character, with rather obtuse angles, it having been shown that materials of acute angular fracture, exert too much of a retarding or holding influence on the brush, thus making the labor of application excessive. A blend of fine pigments with moderately angular crystals is the only mix so far found which brushes uniformly, and it is to secure a proper modification of this brushing character that the fourth pigment is added thereto. Among the available materials may be cited: calcite (calcium carbonate), talc (a tabular magnesium silicate), china clay or kaolin (hydrated aluminum silicate), barytes (native barium sulfate), aragonite and other forms of calcium carbonate, plaster of Paris (anhydrous calcium sulfate), dolomite and other mixed carbonates, feldspar and other complex silicates.

An analysis discloses that one or more pigments of coarse grain are employed to give a requisite thickness of coat; that two pigments of extreme and uniform fineness and grain are employed to give opacity and impermeability as well as elasticity and durability; that an added crystalline material is utilized to modify brushing; that a selection of materials is made to avoid destructive reaction by the pigments upon the paint vehicle; and that the same is a mix of non-poisonous character.

Without specifically limiting myself to the foregoing, I claim:

1. In combination with a suitable paint vehicle, a major pigment composed of approximately 71% sublimed white lead, approximately 18.25% zinc oxid, approximately 7.75% fibrous magnesium silicate, and a fourth pigment, substantially 3%, crystalline in character and of rather obtuse angular formation for facilitating in the application of the paint.

2. In combination with a suitable paint vehicle, a major pigment composed of approximately 71% sublimed white lead, approximately 18.25% zinc oxid, approximately 7.75% fibrous magnesium silicate, and approximately 3% of crystallized calcium carbonate of rather obtuse angular formation for facilitating in application of the paint.

MERRIWEATHER J. WAUGH.

Witnesses:
R. A. WARREN,
RAY C. HALL.